(12) United States Patent
Anderson et al.

(10) Patent No.: US 11,836,765 B2
(45) Date of Patent: *Dec. 5, 2023

(54) SYSTEMS AND METHODS FOR PROVIDING IMPROVED RECOMMENDATIONS

(71) Applicant: Capital One Services, LLC, McLean, VA (US)

(72) Inventors: Jacob Anderson, Plano, TX (US); Mithra Kosur Venuraju, Frisco, TX (US); Shilpa Mittal, Plano, TX (US); Ben Hoang, Garland, TX (US); Amit Deshpande, McKinney, TX (US); Jie Shen, Plani, TX (US)

(73) Assignee: Capital One Services, LLC, McLean, VA (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/408,917

(22) Filed: Aug. 23, 2021

(65) Prior Publication Data
US 2021/0383454 A1 Dec. 9, 2021

Related U.S. Application Data

(63) Continuation of application No. 16/678,233, filed on Nov. 8, 2019, now Pat. No. 11,100,562, which is a
(Continued)

(51) Int. Cl.
G06Q 30/00 (2023.01)
G06Q 30/02 (2023.01)
G06Q 30/0601 (2023.01)
G06Q 30/0283 (2023.01)
G06F 16/84 (2019.01)
(Continued)

(52) U.S. Cl.
CPC ... *G06Q 30/0278* (2013.01); *G06F 16/24578* (2019.01); *G06F 16/84* (2019.01);
(Continued)

(58) Field of Classification Search
CPC .......... G06Q 30/0278; G06Q 30/0283; G06Q 30/0629; G06Q 30/0631; G06Q 30/0643;
(Continued)

(56) References Cited

U.S. PATENT DOCUMENTS 10,032,234 B2 * 7/2018 Sankar ................... G06Q 30/02
10,475,105 B1 11/2019 Anderson et al.
(Continued)

OTHER PUBLICATIONS

Nada Guides, "Car Finder Tool-What Car is Right For Me?", 2018 National Appraisal Guides, Inc., Printed Mar. 7, 2018, 1 page*.
(Continued)

*Primary Examiner* — Robert M Pond
(74) *Attorney, Agent, or Firm* — DLA Piper LLP US

(57) ABSTRACT

Systems and methods for providing improved recommendations are disclosed. In some embodiments, the systems and methods may be used for vehicle recommendations. The system may include a server system configured to receive user historical vehicle preferences, user vehicle preferences, generate weighted feature data sets, and apply a similarity model to the generated weighted feature data set in order to determine a vehicle recommendation data set. A visual representation of the vehicle recommendation data set may then be provided to an interface associated with a user.

20 Claims, 7 Drawing Sheets

Related U.S. Application Data continuation of application No. 16/035,254, filed on Jul. 13, 2018, now Pat. No. 10,475,105.

(51) Int. Cl.
    *G06F 16/9535*     (2019.01)
    *G06F 16/2457*     (2019.01)
    *G06F 18/22*     (2023.01)

(52) U.S. Cl.
    CPC .......... *G06F 16/9535* (2019.01); *G06F 18/22* (2023.01); *G06Q 30/0283* (2013.01); *G06Q 30/0629* (2013.01); *G06Q 30/0631* (2013.01); *G06Q 30/0643* (2013.01)

(58) Field of Classification Search
    CPC ................. G06F 16/84; G06F 16/9535; G06F 16/24578; G06F 18/22
    USPC ..................................................... 705/26, 27
    See application file for complete search history.

(56) References Cited

U.S. PATENT DOCUMENTS

| | | | |
|---|---|---|---|
| 10,810,656 B1* | 10/2020 | McCroskey | G06Q 30/0641 |
| 2008/0154878 A1 | 6/2008 | Rose et al. | |
| 2009/0006118 A1 | 1/2009 | Pollak | |
| 2009/0327270 A1 | 12/2009 | Teevan et al. | |
| 2010/0251305 A1 | 9/2010 | Kimble et al. | |
| 2012/0221562 A1* | 8/2012 | Zhang | G06F 16/951 707/E17.014 |
| 2013/0232128 A1 | 9/2013 | Krishnan et al. | |
| 2014/0046965 A1* | 2/2014 | Tian | G06F 16/24578 707/749 |
| 2014/0379708 A1* | 12/2014 | Fox | G06Q 30/0207 707/728 |
| 2015/0363838 A1* | 12/2015 | Wu | G06Q 30/0278 705/306 |
| 2016/0253706 A1* | 9/2016 | Kursar | G06Q 30/0613 705/14.58 |
| 2016/0364783 A1 | 12/2016 | Ramanuja et al. | |
| 2017/0337573 A1 | 11/2017 | Toprak et al. | |

OTHER PUBLICATIONS

"Improving web search results by considering diversification, intention and similiarity", Jafarian Dehkordi, Leleh. State University of New York at Binghamton, ProQuest Dissertations Publishing, 2012. 1529174, ProQuest IS 1152021061; 62 pages, (2012)*.

* cited by examiner

SYSTEMS AND METHODS FOR PROVIDING IMPROVED RECOMMENDATIONS

CROSS-REFERENCE

This application is a continuation of U.S. application Ser. No. 16/678,233, filed Nov. 8, 2019, which is a continuation of U.S. application Ser. No. 16/035,254 filed Jul. 13, 2018, now U.S. Pat. No. 10,475,105, issued Nov. 12, 2019, and the entirety of which are incorporated by reference herewith.

TECHNICAL FIELD

The present disclosure is directed towards systems and method for providing improved recommendations.

BACKGROUND

Systems and methods for providing recommendations are often unable to quantify similarities and differences between objects in a way that would allow for recommendations based on the similarity of objects (e.g., "If you like X, you will also like Y").

Systems and methods for providing recommendations are often also unable to provide enough variability between the recommended object and the initial input object. For example, in conventional recommendation systems, a person who indicates that they may like a "Toyota Corolla" may be presented with a "Toyota Corolla Sport" which is too similar to be considered a distinct option from the initial input. Additionally, many vehicle recommendation engines are unable to provide recommendations that incorporate variety. For example, a person may be asked to enter information about a make and model in order to view similar vehicles (all having the same make and model but different luxury specifications) but not be presented with vehicles of a different brand.

Additionally, some conventional systems and methods for providing recommendations, may present users with recommendations that are not particularly relevant or accurately responsive to their needs. For that reason, users may have to spend immense amounts of time to iteratively screen thru a list of recommendations and traverse a user interface. For example, it is estimated that a user may spend approximately 8 hours scrolling thru recommendations and/or browsing a website or mobile application for viewing vehicles on a conventional recommendation engine.

Moreover, conventional recommendation systems are based primarily on direct user input, which requires a user to have extensive knowledge of the field. In particular, vehicle recommendations often require an individual to enter their preferences directly. Preferences may include make, model, mileage, location, optional features, and condition. However, users may not always be able to recall or have knowledge of the preferences they would like. Additionally, the users may be better suited for a style or option for an object that is different than the preference they self-select.

SUMMARY

The present disclosure illustrates systems and methods for providing improved recommendations. In some embodiments, the improved recommendations may be for vehicles.

In some embodiments of the present disclosure a method for providing improved vehicle recommendations may include receiving by a recommendation engine embodied in a server system user vehicle preference data, receiving user historical vehicle preference data, generating a weighted feature data set based on the received user vehicle preference data and the received user historical vehicle preference data, where the generated weighted feature data set further including a plurality of data units, applying a similarity model to the generated weighted feature data set to determine a vehicle recommendation data set including at least one vehicle and its associated vehicle features, where each vehicle feature is associated with a subset of the plurality of data units for the generated weighted feature data set, and providing a visual representation of the vehicle recommendation data set for display in an interface associated with the user.

In some embodiments, the step of generating the weighted feature data set may include mapping the received user vehicle preference data to a user vehicle preference data set having data corresponding to the plurality of data units, mapping the received user historical vehicle preference data to a user historical vehicle preference data set having data corresponding to the plurality of data units, determining an influence factor for each of the received user vehicle preference data and the received user historical vehicle preference data, and aggregating the user vehicle preference data set and the user historical vehicle preference data set in accordance with the determined influence factor to form the weighted feature data set. In some embodiments, the method may include applying one or more filters to the vehicle recommendation data set. In some embodiments the method may also include the user vehicle preference data further having at least one of user preferences directly provided by a user corresponding to at least one of a vehicle and vehicle features, and user preferences directly provided by a user corresponding to a questionnaire related to at least one of vehicle features and a vehicle. In some embodiments, the user historical vehicle preference data further includes user preferences for a vehicle determined based on historical viewing patterns of a user. In some embodiments, the similarity model is a cosine similarity model. In some embodiments, the vehicle features include at least one of fuel efficiency, mileage, price, engine, year, fuel type, drive train, exterior color, body style, condition, and transmission. In some embodiments, applying the similarity model to the generated weighted feature data set to determine a vehicle recommendation data set further includes: generating a feature representation for a vehicle data set, determining one or more similarity values between the feature representation for the vehicle set and the generated weighted feature data set, and selecting one or more vehicles corresponding to at least a subset of feature representation for the vehicle set having the closest determined similarity values.

In some embodiments of the present disclosure a method for displaying improved vehicle recommendations includes the steps of receiving user vehicle preference data from a user via a user interface, determining user historical vehicle preference data based on user usage of the user interface, transmitting the user vehicle preference data and the user historical vehicle preference data to a server system communicatively coupled to the user interface via a network, where the server system applies a similarity model to determine a vehicle recommendation data set based at least in part on the user vehicle preference data and the user historical vehicle preference data, wherein the vehicle recommendation data set includes at least one vehicle and its associated vehicle features, and wherein each vehicle feature is associated with a subset of a plurality of data units for a generated weighted feature data set based on the user vehicle preference data and the user historical vehicle preference data, receiving, from the server system, the vehicle recommendation data set, and displaying, on the user interface, at least a portion of the vehicle recommendation data set.

In some embodiments, the vehicle features include at least one of fuel efficiency, mileage, price, engine, year, fuel type, drive train, exterior color, body style, condition and transmission. In some embodiments, the user vehicle preference data includes at least one of user preferences directly provided by a user corresponding to at least one of a vehicle and vehicle features, and user preferences directly provided by a user corresponding to a questionnaire related to at least one of vehicle features and a vehicle. In some embodiments, determining user historical vehicle preference data based on user usage of the user interface includes determining vehicles and or vehicle features previously browsed by the user.

In some embodiments of the present disclosure a system for providing improved vehicle recommendations includes a processor and non-volatile memory storing computer program code that when executed on the processor causes the processor to execute a process. The process may be operable to receive user vehicle preference data, receive user historical vehicle preference data, generate a weighted feature data set based on the received user vehicle preference data and the received user historical preference data, the generated weighted feature data set further including a plurality of data units, apply a similarity model to the generated weighted feature data set to determine a vehicle recommendation data set, wherein the vehicle recommendation data set includes at least one vehicle and its associated vehicle features, wherein each vehicle feature is associated with a subset of the plurality of data units for the generated weighted feature data set, and provide a visual representation of the vehicle recommendation data set to a user computing device communicatively coupled to the processor.

In some embodiments, when generating the weighted feature data set, the processor is further configured to map the received user vehicle preference data to a user vehicle preference data set having data corresponding to the plurality of data units, map the received user historical vehicle preference data to a user historical vehicle preference data set having data corresponding to the plurality of data units, determine an influence factor for each of the received user vehicle preference data and the received user historical vehicle preference data, and aggregate the user vehicle preference data set and the user historical vehicle preference data set in accordance with the determined influence factor to form the weighted feature data set. In some embodiments, the system may also include a database configured to store at least one of user data, historical data, vehicle data, and models. In some embodiments, a similarity model includes a similarity cosine model. In some embodiments, the processor is further configured to apply one or more filters to the recommendation data. In some embodiments, the vehicle features include at least one of fuel efficiency, mileage, price, engine, year, fuel type, drive train, exterior color, body style, condition, and transmission. In some embodiments, the user vehicle preference data further include at least one of user preferences directly provided by a user corresponding to at least one of a vehicle and vehicle features, and user preferences directly provided by a user corresponding to a questionnaire related to at least one of vehicle features and a vehicle, and wherein the user historical vehicle preference data is based on vehicles and or vehicle features previously browsed by the user using the user interface. In some embodiments, applying the similarity model to the generated weighted feature data set to determine a vehicle recommendation data set further includes generating a feature representation for a vehicle data set, determining one or more similarity values between the feature representation for the vehicle set and the generated weighted feature data set, and selecting one or more vehicles corresponding to at least a subset of feature representation for the vehicle set having the closest determined similarity values.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The present disclosure illustrates systems and methods for providing improved recommendations. In some embodiments, the recommendations may be for vehicles. Although an example for an improved recommendation system that involves vehicles are described herein, it is envisioned that the recommendation engine described herein may be used or adapted for use with other objects (e.g., hotels, consumer goods, clothing, purses, houses), experiences (e.g., concerts, shows, restaurants) and the like. In some embodiments, the recommendations may be for objects having a plurality of features that may vary. Accordingly, in some embodiments the systems and methods may compare objects based on variations across one or more of their plurality of features in order to make a recommendation.

Figure 1:
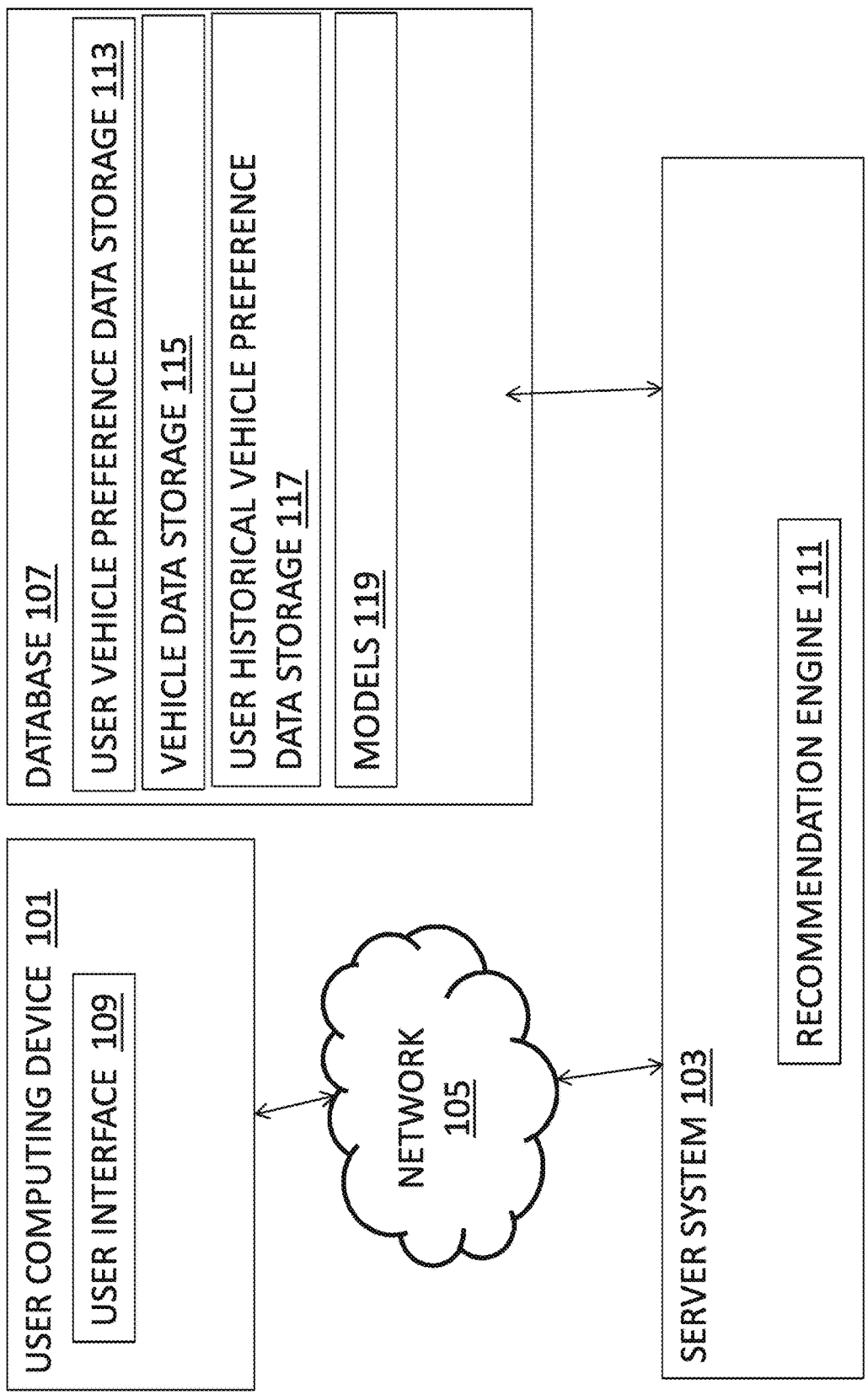
FIG. 1 illustrates a system for providing improved recommendations for vehicles built in accordance with an aspect of the present disclosure.

FIG. 1 illustrates a system for providing improved recommendations for vehicles in accordance with an aspect of the present disclosure. The system may include a user computing device 101 that has a user interface 109 and is communicatively coupled to a server system 103 via a network 105. The server system 103 may include a recommendation engine 111 that is configured to provide improved recommendations for vehicles or other objects. The server system 103 may be communicatively coupled to a database 107. The database 107 may be further configured to store user vehicle preference data storage 113, vehicle data storage 115, user historical preference data storage 117, and/or models 119.

In some embodiments, the user interface 109 may be an application or a website on a mobile device, tablet, computing system or the like. In some embodiments, the user interface 109 may be configured to present a user with a collection of items (and their descriptions) such that the user may be able to browse the collection of items. In some embodiments, the user interface 109 may be configured to present the user with a questionnaire from which user vehicle preference data may be determined. In some embodiments, the user interface 109 may be configured to determine, store and/or convey information regarding historical viewing patterns of a user.

The network 105 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks.

Figure 2:
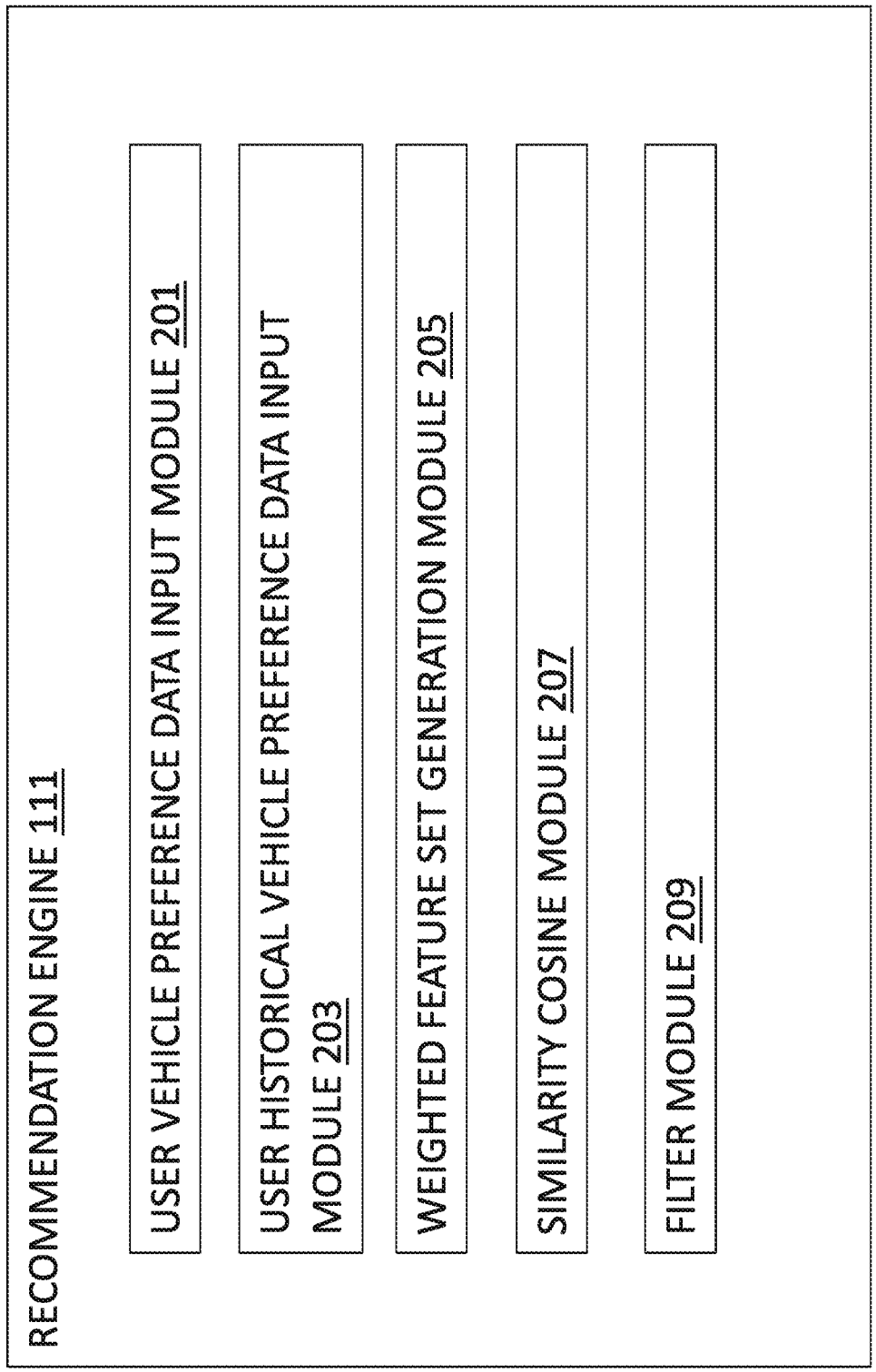
FIG. 2 illustrates a component of the system for providing improved recommendations for vehicles built in accordance with an aspect of the present disclosure.

FIG. 2 illustrates a component of the system for providing improved recommendations for vehicles in accordance with an aspect of the present disclosure. As illustrated in FIG. 2, in some embodiments, the recommendation engine 111 on the server system 103 may include one or more modules. In some examples, some or all of the logic for the above-described techniques may be implemented as a computer program or application or as a plug in module or sub component of another application. The described techniques may be varied and are not limited to the examples or descriptions provided. In some examples, applications may be developed for download to mobile communications and computing devices, e.g., laptops, mobile computers, tablet computers, smart phones, etc., being made available for download by the user either directly from the device or through a website.

As illustrated in FIG. 2, the recommendation engine 111 may include a user vehicle preference data input module 201, a user historical vehicle preference data input module 203, a weighted feature set generation module 205, a similarity cosine module 207 and/or a filter module 209.

In some embodiments, the user vehicle preference data input module 201 may be configured to be communicatively coupled with the user interface and be configured to receive user vehicle preference data. In some embodiments, the user vehicle preference data input module 201 may present a user with a questionnaire, survey, or the like, and receive user vehicle preference data for a vehicle or vehicle features that the user prefers. For example, the user may provide the user vehicle preference data input module 201 with a make, model, and the like. In another example, the user vehicle preference input module 201 may receive answers to questions provided by the user vehicle preference input module 201. For example, the user may provide the user vehicle preference input module 201 with answers to questions like "How many people will usually ride in the car?," "How often will you drive the car?" "How far will you drive the car?". Each of the questions in the questionnaire presented to the user may map to one or more vehicle features and/or vehicles. For example, the question "How many people will usually ride in the car?" may map to vehicle features such as body, style, engine, and the like. In some embodiments, the user vehicle preference data may include user preferences directly provided by a user (e.g., make and model of a car, or direct answers for body, style, engine). In some embodiments, the user vehicle preference data may include user preferences derived from answers to a questionnaire. In some embodiments, the user preferences may correspond to a particular vehicle. In some embodiments, the user preferences may correspond to a particular vehicle feature. In some embodiments, the user vehicle preference data input module 201 may interface with the database 107 and store and/or retrieve user vehicle preference data in and/or from the user vehicle preference data storage 113. Vehicle features may include, but are not limited to, fuel efficiency, mileage, price, engine, year, fuel type, drive train, exterior color, body style, condition, and transmission.

In some embodiments, the user historical preference data input module 203 may be configured to receive and/or determine user historical vehicle preference data. For example, user historical vehicle preference data may include user preferences for a vehicle determined based on past user viewing and browsing history on the user interface 109. For example, in some embodiments, the last five vehicles viewed on the user interface 109 may be used as user historical preference data. Alternatively and/or additionally, the user historical vehicle preference data input module 203 may utilize viewing and browsing history for a demographic similar to the user, and the like (e.g., women between ages 25-40). In some embodiments, the user historical vehicle preference data input module 203 may interface with the database 107 and store and/or retrieve user historical vehicle preference data in and/or from the user historical vehicle preference data storage 117.

In some embodiments, the user historical preference data and user vehicle preference data may be transmitted from the user vehicle preference data input module 201 and the user historical preference data input module 203 to the weighted feature set generation module 205. The weighted feature set generation module 205 may be configured to generate a weighted feature data set based on the received user vehicle preference data and the received user historical preference data. In some embodiments, the weighted feature data set may be represented as a vector including a plurality of data units. A subset (e.g., one or more) of the plurality of data units may correspond to a particular vehicle feature.

In some embodiments, generating a weighted feature data set at the weighted feature set generation module 205 may include mapping the received user vehicle preference data to a user vehicle preference data set and mapping the received user historical vehicle preference data to a received user historical vehicle preference data set. In some embodiments, each of the user vehicle preference data set and the user historical vehicle preference data set may be represented as vectors having a plurality of data units. In some embodiments, a subset of the plurality of data units may correspond to a particular vehicle feature.

In some embodiments, when mapping the received user vehicle preference data to a user vehicle preference data set, the user's responses to each question presented in the questionnaire may map to a set of vehicle features, and sets of vehicle features may then be aggregated to form the user vehicle preference data set. Notably, the user vehicle preference data set may have a different size and dimension than the user historical vehicle preference data set and/or the weighted feature set (discussed below). For example, if two different questions map to two different sets of vehicle features: {SUV, 6-cylinder, 2017} and {SUV, 8-cylinder, 2016, 2017}, the answers to the two questions may be aggregated to form a user vehicle preference data set expressed as {SUV: 2; 6-cylinder: 1; 8-cylinder:1; 2016: 1; 2017: 2}. In some embodiments, the user vehicle preference data set may include a field for each possible data unit, and have an integer value associated with each data unit. The integer value may be representative of the frequency at which the user's answers to questions in the questionnaire is associated with a particular data unit. In some embodiments, the integer value may be determined based on an indicated importance, etc. of a feature associated with a particular data unit, based on the received user vehicle preference data.

As discussed above, in some embodiments the user's responses to questions presented in the questionnaire may map to a set of vehicle features. For example, if a user answers "Yes" to the question, "Will you be carrying more than 2 people?," the user response may map to {SUV, SEDAN}.

In some embodiments, mapping the received user historical vehicle preference data to a received user historical vehicle preference data set may include retrieving the browsing history of a user on the user interface, and determining vehicle attributes associated with a subset of the past viewed vehicles. For example, in some embodiments, vehicle attributes associated with the past 3, 5, 10, 20, or 100, vehicles may be determined. For each viewed vehicle, the vehicle attributes for the viewed vehicle may be mapped to a set of vehicle features. For example, a Honda CR-V may map to: {SUV, 6-Cylinder, 2016}. Similar to the process described above with respect to the user vehicle preference data set, the set of vehicle features for each of the past vehicles may be aggregated to form the received user historical vehicle preference data set. For example, if a user viewed two SUVs in succession on the user interface 109, the received user historical vehicle preference data set may be represented as: {SUV: 2; 6-cylinder: 1; 8-cylinder:1; 2016: 1; 2017: 2}. In some embodiments, the user historical vehicle preference data set may include a field for each possible data unit, and have an integer value associated with each data unit. The integer value may be representative of the frequency at which a particular data unit appeared in the user's browsing history.

In some embodiments, generating the weighted feature data set may also include the step of determining an influence factor for each of the received user vehicle preference data and the received user historical vehicle preference data. Based on the influence factor, the weighted feature data set may aggregate the user vehicle preference data set and the user historical vehicle preference data set in accordance with the determined influence factor to form the weighted feature data set. The influence factor, may be represented as a multiplicative factor, percentage, and/or weighting. In some embodiments, the influence factor may be representative of whether the user historical vehicle preferences (e.g., based on viewing history) or the user vehicle preferences (e.g., based on explicit or implicit user answers) is better representative of the user's true preferences and forms the basis of the recommendations generated by the recommendation engine 111.

In some embodiments, generating the weighted feature data set may include initially populating the weighted feature data set based on the received user vehicle preference data and then refining the weighted feature data set based on the received user historical vehicle preference data. In such an embodiment, the user vehicle preference data sets may be aggregated with the user historical vehicle preference data sets to generate the weighted feature data set.

In some embodiments, a vector representing a weighted feature set may include the following data units: fuel efficiency, mileage, price, engine, year, diesel, gasoline, flexible-fuel, hybrid, electric, front wheel drive, rear wheel drive, all-wheel drive, four wheel drive, two wheel drive, white, brown, yellow, gold, black, gray, silver, red, blue, green, orange, bronze, beige, purple, burgundy, pink, turquoise, convertible, couple, hatchback, sedan, sports utility vehicle (SUV), pickup, minivan, van, wagon, new, used, automatic, and manual.

In some embodiments, the vector may include a single data unit corresponding to each of the following vehicle features: fuel efficiency, mileage, price, engine, and year. In some embodiments, the vector may include a plurality of data units corresponding to each of the following vehicle feature categories: fuel type (corresponding to data units: diesel, gasoline, flexible-fuel, hybrid, electric), exterior color (corresponding to data units white brown, yellow, gold, black, gray, silver, red, blue, green, orange, bronze, beige, purple, burgundy, pink, turquoise), drive type (corresponding to data units: front wheel drive, rear wheel drive, all-wheel drive, four wheel drive, two wheel drive), body style (corresponding to data units: convertible, coupe, hatchback, sedan, sports utility vehicle (SUV), pickup, minivan, van, wagon), condition (corresponding to data units: new, used) and transmission (corresponding to data units: automatic, and manual).

In some embodiments, vehicle features having a single data unit corresponding to vehicle features such as fuel efficiency, mileage, price, engine, and year, may expressed as a value between 0 and 1. For example, the range of possible fuel efficiencies may be mapped to values between 0 and 1. For example, for body style, a convertible may be expressed as 0.22, a coupe may be expressed as 0.29, a sedan may be expressed as 0.36, a hatchback may be expressed as 0.43, a wagon may be expressed as 0.5, an SUV may be expressed as 0.57, a pickup may be expressed as 0.64, a minivan may be expressed as 0.71, and a van may be expressed as 0.78. In another example, for an engine, a 2-cylinder may map to 0.15, a 4-cylinder to 0.29, 6 Cylinder to 0.43, 10 Cylinder 0.71, etc. In one embodiment, different engine options from the user vehicle preference data set may be averaged together to form a weighted data set in the following manner: supposing the user preference weighted vehicle feature set has a value of 3 associated with 4 Cylinder and a value of 2 associated with 6 Cylinder, the averaged value in the Engine column of the user preference data set becomes (3*0.15+2*0.29)/5.

In some embodiments, the mapping to values between 0 and 1 may illustrate and capture similarities between entries. For example, a 2 Cylinder that is expressed as 0.15 may be more similar to a 4 Cylinder expressed as 0.43 than a 10 Cylinder expressed as 0.71.

In accordance with the processes described above, the weighted feature set generation module 205 may generate the weighted feature data set. The generated weighted feature data set may then be passed from the weighted feature set generation module 205 to a similarity model configured to determine a vehicle recommendation set based on the weighted feature data set. Any number of known models or techniques may be used to determine the vehicle recommendation set. In some embodiments, the similarity model may be applied by similarity cosine module 207. The similarity cosine module 207 may be configured to apply a similarity model to the generated weighted feature data set to determine a vehicle recommendation data set including at least one vehicle and its associated vehicle features. In some embodiments, the similarity model may be a cosine distance based similarity model. In some embodiments, the cosine similarity model may be configured to minimize the distance between the vector representation of the weighted feature data set and a vehicle represented as a vector within the space. In some embodiments, cosine distance calculations may be generated between the user preference vector and vehicles in a vector vehicle data set. In this manner, the vehicle having a feature set most similar to the generated weighted feature data set may be determined. In some embodiments, applying the similarity model to the generated weighted feature data set to determine a vehicle recommendation data set may include generating a feature representation for a vehicle data set, determining one or more similarity values between the feature representation for the vehicle set and the generated weighted feature data set and selecting one or more vehicles corresponding to at least a subset of a feature representation for the vehicle set having the closest determined similarity values. This may result in a value between 0 and 1 being associated with each vehicle in the vehicle data set, where the vehicles associated with the greater values (closer to 1) are representative of vehicles that are more similar to the ideal vehicle represented by the weighted feature data set.

In some embodiments, the computer instructions for the similarity cosine model may be stored in models storage component 119 of the database. Additionally, the vehicle data to which the weighted feature data set model is matched may be stored in and accessed from the vehicle data storage 115 of the database 107. In some embodiments, vector representations of all possible vehicles may be stored in the vehicle storage 115 of database 117.

In some embodiments, the vehicle recommendation data set may include a collection of a plurality of vehicles ranked by their similarity to the generated weighted feature data set. In some embodiments, a filter may be applied after generating the vehicle recommendation data set. For example, a filter may ensure that recommendations are below a maximum price specified in the request. In another example, a filter may ensure that recommended vehicles fall within the location and radius specified in the request. Additionally, filters may be used to force variety between the models and makes listed in the vehicle recommendation data set. For example, the filter may ensure that particular make and model combinations are not recommended twice in any given set of recommended vehicles. In this example, the filter may ensure that make and model combinations already aggregated into the recommendation list may be skipped over when procuring additional recommendations. In some embodiments, the filter may be applied by the filter module 209. In some embodiments, the filter may enforce distinctiveness in the make and model of the subset of vehicle recommendations displayed to the user via the user interface.

The vehicle recommendation data set may then be provided by the recommendation engine 111 to a user computing device 101 for display on the user interface 109. For example, a visual representation of the vehicle recommendation data set may be provided for display in the user interface 109. Example visual representations may include profiles, charts, digital flip books, and the like. In some embodiments, a user's interaction with the vehicle recommendation data set presented for display on the user interface 109 may be used to update the generated weighted feature data set. In this manner, the recommendations provided by the vehicle recommendation data set may be improved over time.

Figure 3:
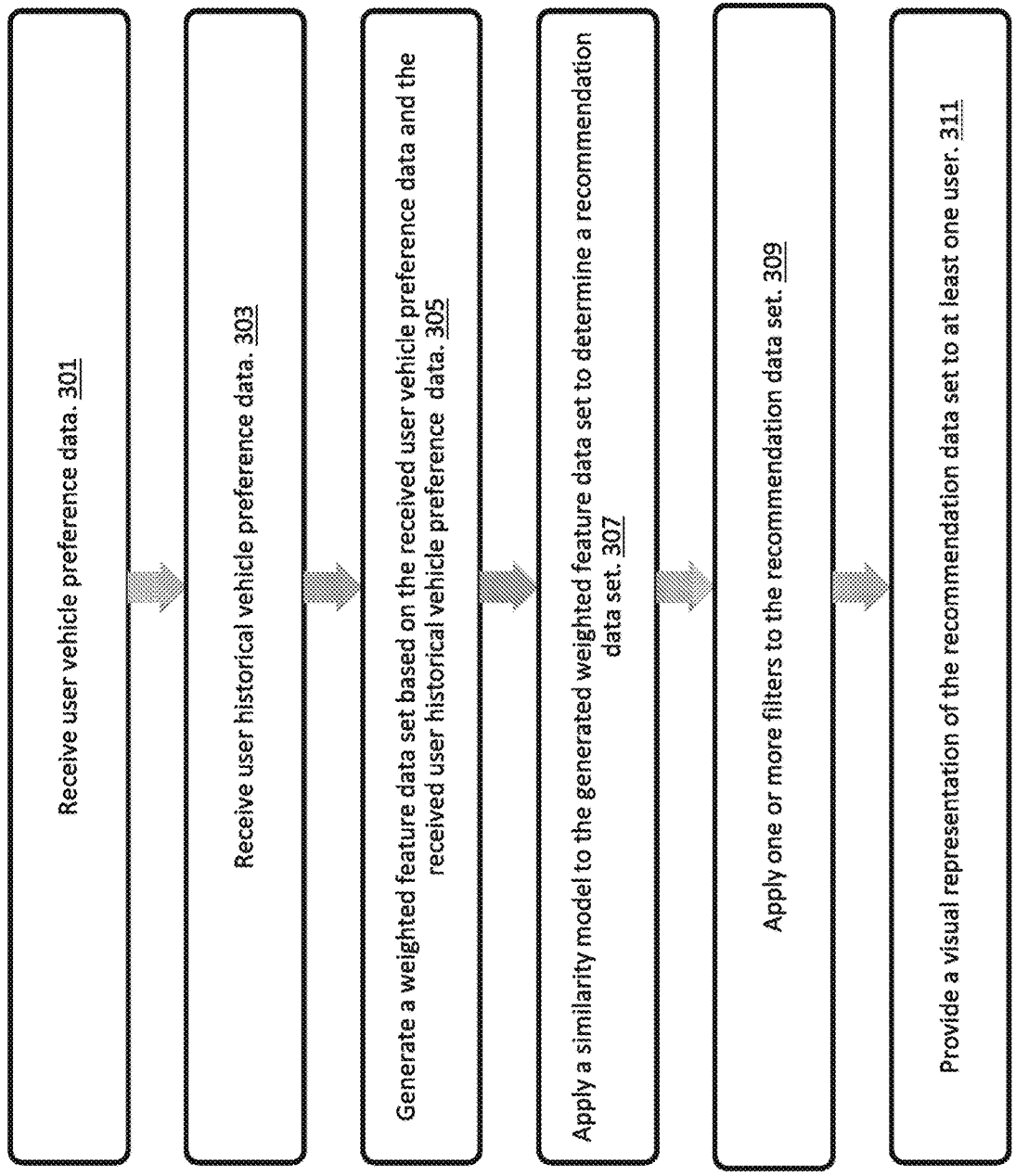
FIG. 3 illustrates a method for a process for providing improved recommendations for vehicles built in accordance with an aspect of the present disclosure.

FIG. 3 illustrates a method for a process for providing improved recommendations for vehicles in accordance with an aspect of the present disclosure, as similarly described above. In some embodiments, the process illustrated in FIG. 3 may be implemented by a server system such as server system 103 of FIG. 1. In a first step, the server system may receive user vehicle preference data 301. In a second step, the server system may receive user historical vehicle preference data 303. In a third step, the server system may generate a weighted feature data set based on the received user vehicle preference data and the received user historical vehicle preference data 305. In a fourth step, the server system may apply a similarity model to the generated weighted feature data set to determine a recommendation data set 307. In a fifth step, the server system may apply one or more filters to the recommendation data set 309. In a sixth step, the server system may provide a visual representation of the recommendation data set to at least one user 311.

Systems and methods for providing improved vehicle recommendations implementing the process illustrated in FIG. 3 may provide many benefits over conventional systems. For example, in some embodiments, the described systems may apply a mapping to vehicles such that the recommendation system is better able to provide recommendations that take into account the similarities between categorical values. For example, the described systems and methods map SUVs as being more similar to minivans than coupes. Additionally, the described systems and methods provide benefits over conventional systems as they are able to interpret a user's answers to questions about the user's usage into desired vehicle features, without requiring the user to know a particular make and model beforehand. Furthermore, the disclosed systems and methods are not as closely tied to the user's prejudiced knowledge of makes, models and vehicle features and is better able to match the user's needs to vehicles. Moreover, the disclosed systems and methods provide the user with forced variability in the recommendation set. For example, instead of viewing three essentially similar cars (as would be done by conventional systems), the described systems and methods can be configured to provide the user with different cars, providing the user with a broader scope of information. In this manner, the provided systems and methods are able to provide improved recommendations that reduce the user's needed time on a user interface such as user interface 109 of FIG. 1.

Figure 4:
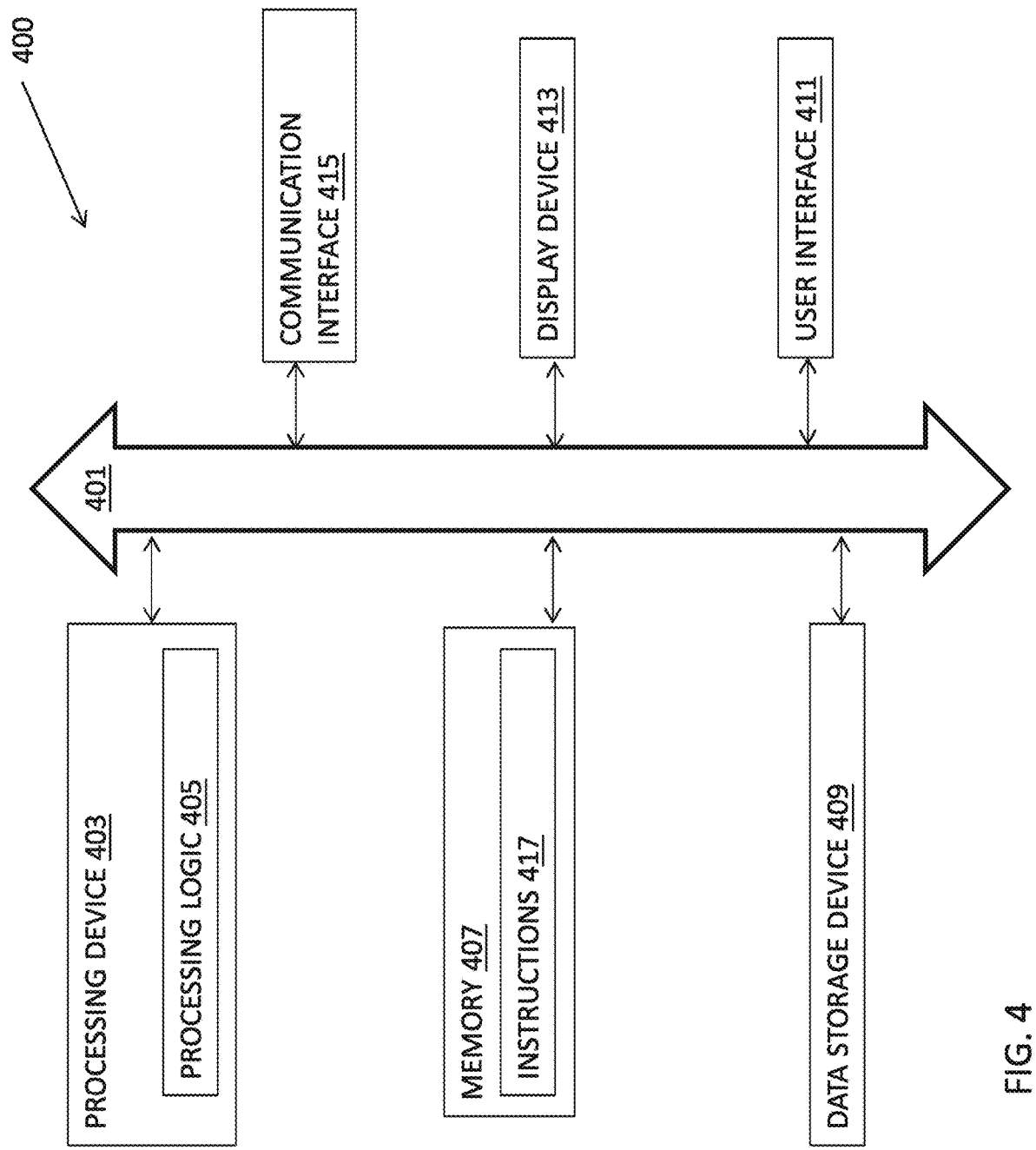
FIG. 4 illustrates a system diagram for a computing system in accordance with an aspect of the present disclosure.

FIG. 4 is a system diagram for a computing device used in a system built in accordance with an embodiment of the present disclosure. FIG. 4 illustrates a functional block diagram of a machine in the example form of computer system 400, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, the user computing device 101, and/or server system 103 of FIG. 1 may be implemented by the example machine shown in FIG. 4 (or a combination of two or more of such machines).

Example computer system 400 may include processing device 403, memory 407, data storage device 409 and communication interface 415, which may communicate with each other via data and control bus 401. In some examples, computer system 400 may also include display device 413 and/or user interface 411.

Processing device 403 may include, without being limited to, a microprocessor, a central processing unit, an application specific integrated circuit (ASIC), a field programmable gate array (FPGA), a digital signal processor (DSP) and/or a network processor. Processing device 403 may be configured to execute processing logic 405 for performing the operations described herein. In general, processing device 403 may include any suitable special-purpose processing device specially programmed with processing logic 405 to perform the operations described herein.

Memory 407 may include, for example, without being limited to, at least one of a read-only memory (ROM), a random access memory (RAM), a flash memory, a dynamic RAM (DRAM) and a static RAM (SRAM), storing computer-readable instructions 417 executable by processing device 403. In general, memory 407 may include any suitable non-transitory computer readable storage medium storing computer-readable instructions 417 executable by processing device 403 for performing the operations described herein. Although one memory device 407 is illustrated in FIG. 4, in some examples, computer system 400 may include two or more memory devices (e.g., dynamic memory and static memory).

Computer system 400 may include communication interface device 411, for direct communication with other computers (including wired and/or wireless communication), and/or for communication with network 105 (see FIG. 1). In some examples, computer system 400 may include display device 413 (e.g., a liquid crystal display (LCD), a touch sensitive display, etc.). In some examples, computer system 400 may include user interface 411 (e.g., an alphanumeric input device, a cursor control device, etc.).

In some examples, computer system 400 may include data storage device 409 storing instructions (e.g., software) for performing any one or more of the functions described herein. Data storage device 409 may include any suitable non-transitory computer-readable storage medium, including, without being limited to, solid-state memories, optical media and magnetic media.

Figure 5:
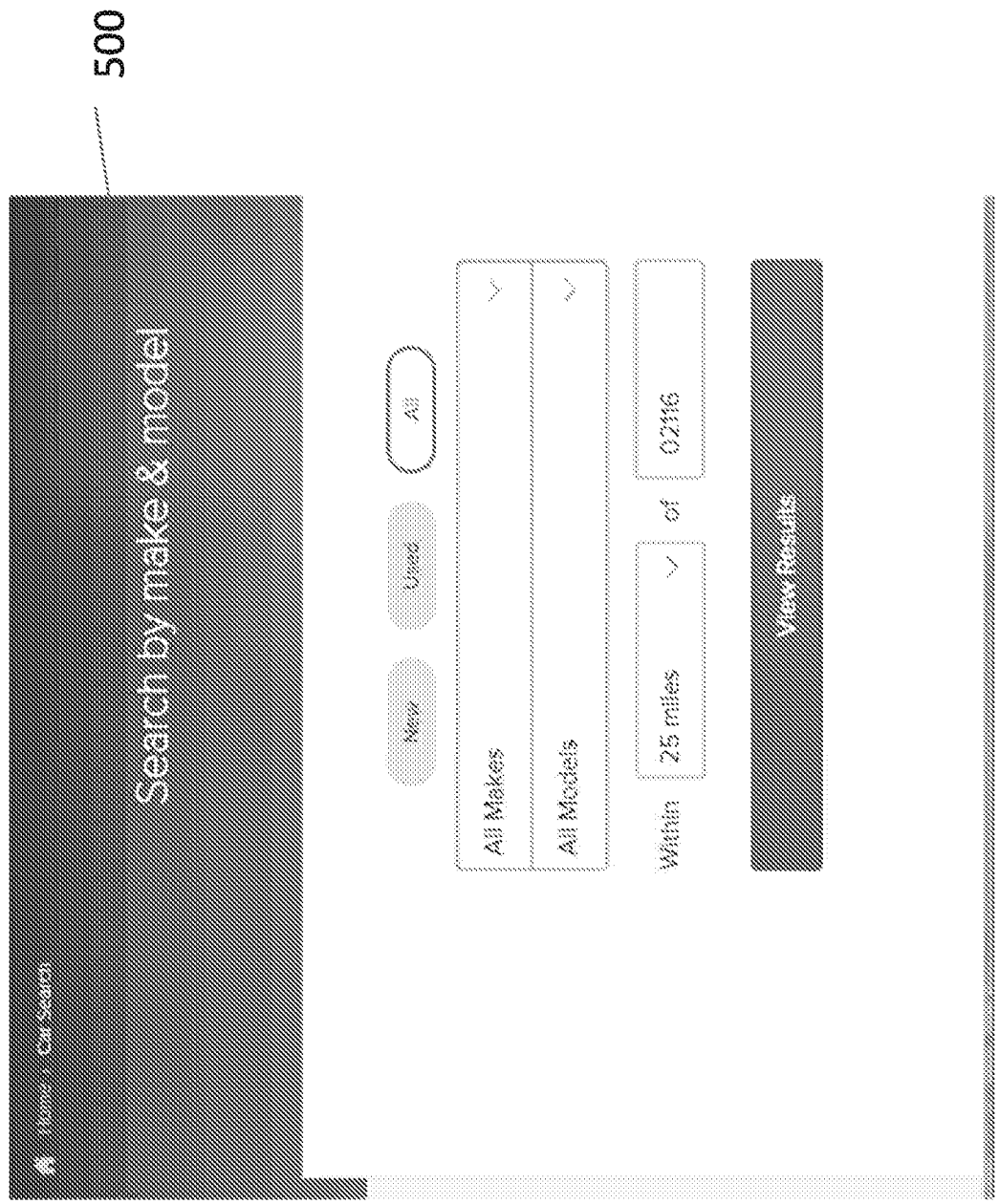
FIG. 5 illustrates a graphical user interface in accordance with an aspect of the present disclosure.
Figure 6:
FIG. 6 illustrates a graphical user interface in accordance with an aspect of the present disclosure.
Figure 7:
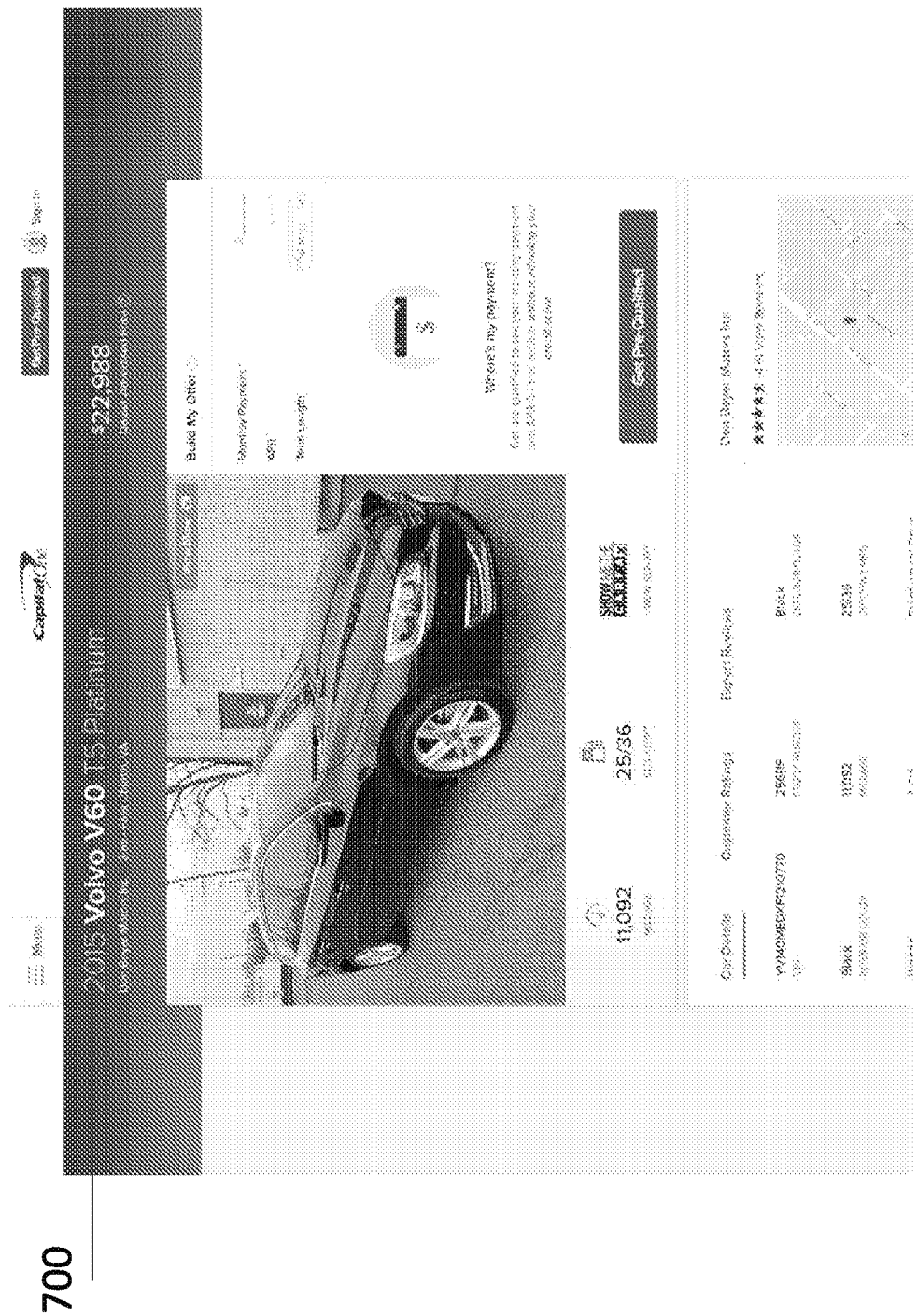
FIG. 7 illustrates a graphical user interface in accordance with an aspect of the present disclosure.

In some embodiments, the visual representations of the vehicle recommendation data set may be optimized for display in the user interface 109. FIGS. 5-7 illustrate examples of graphical user interfaces that include visual representations of aspects the vehicle recommendation data set. For example, the embodiments illustrated in FIGS. 5-7 provide an improved user interface (e.g., website, mobile application) for an electronic device (e.g., tablet, smartphone, personal computer, laptop). The user interface may be an improvement upon conventional systems because the user interface may be configured to display all or only a portion of the vehicle recommendation data set. For example, the user interface on a mobile device may be configured to display the vehicles in the vehicle recommendation data set on a scrolling basis from most to least relevant. In this manner, the scrolling time and processing demands on the mobile device may be reduced.

In particular, FIG. 5 illustrates a graphical user interface in accordance with an aspect of the present disclosure. In some embodiments, a graphical user interface such as the one depicted in FIG. 5 may be provided with a visual representation of the vehicle recommendation data set by the server system. As illustrated, in some embodiments, the graphical user interface may also be used to retrieve data from the user regarding the vehicle preferences.

FIG. 6 illustrates a graphical user interface in accordance with an aspect of the present disclosure. As illustrated in FIG. 6, in some embodiments, a graphical user interface may be configured to display a panel 600 that shows the user historical vehicle preference data and/or a vehicle recommendation set that is heavily influenced by the user historical vehicle preference data.

FIG. 7 illustrates a graphical user interface in accordance with an aspect of the present disclosure. In the example depicted in FIG. 7, detailed vehicle information 700 may be displayed to a user of the user interface upon selecting a vehicle from among the vehicles of the vehicle recommendation set. For example, the detailed vehicle information 700 may be configured to be displayed on a website.

Although the present disclosure may provide a sequence of steps, it is understood that in some embodiments, additional steps may be added, described steps may be omitted, and the like. Additionally, the described sequence of steps may be performed in any suitable order.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

We claim:

1. A method for displaying improved vehicle recommendations comprising:
    providing, by a server system communicatively coupled to a user computing device on a user interface of the user computing device, a plurality of vehicle selections;
    determining, on the user computing device, user vehicle preference data based on user interaction with the provided plurality of vehicle selections in a user session;
    transmitting, the determined user vehicle preference data to the server system;
    receiving, from the server system, varied vehicle recommendation data comprising a plurality of vehicles each having a different vehicle make and vehicle model combination, wherein the varied vehicle recommendation data is generated by generating a weighted feature data set having weights based on the determined user vehicle preference data, applying a similarity model, and applying a variability filter; and
    displaying, on the user interface, a visual representation of the varied vehicle recommendation data.

2. The method of claim 1, wherein determining user vehicle preference data based on user interaction with the provided plurality of vehicle selections comprises providing at least one of vehicle and vehicle features to a user of the user computing device and receiving user selections of preferred vehicle or vehicle features.

3. The method of claim 1, wherein determining user vehicle preference data based on user interaction with the provided plurality of vehicle selections comprises tracking user browsing history on the user computing device.

4. The method of claim 3, wherein the browsing history includes at least one of vehicles or vehicle features previously browsed by a user using the user interface.

5. The method of claim 1, wherein determining user vehicle preference data comprises providing a user with a questionnaire regarding user vehicle preference data.

6. The method of claim 1, wherein the visual representation comprises at least one of profiles, charts, and digital flip books.

7. The method of claim 1, wherein the user computing device comprises instructions to perform operations comprising:
determining user interaction with the displayed visual representation of the varied vehicle recommendation data;
generating updates to the weighted feature data set;
transmitting the updated weighted feature data set to the server system;
receiving from the server system an updated varied vehicle recommendation data; and
displaying a second visual representation on the user interface including the updated varied vehicle recommendation data.

8. The method of claim 1, wherein the user interface is optimized for display on the user computing device by displaying a subset of the varied vehicle recommendation data in accordance with relevancy.

9. The method of claim 1, wherein the user interface comprises a panel configured to display the determined user vehicle preference data.

10. The method of claim 1, wherein the user interface comprises detailed vehicle information for any vehicles selected from the displayed visual representation.

11. A system for providing an interface for a computing device to convey improved vehicle recommendations, the system comprising:
at least one memory storing instructions;
a server system configured to generate a visual representation of varied vehicle recommendation data; and
a user computing device including at least one processor configured to execute instructions to:
provide, by the server system communicatively coupled to the user computing device on a user interface of the user computing device, a plurality of vehicle selections;
determine, on the user computing device, user vehicle preference data based on user interaction with the provided plurality of vehicle selections in a user session;
transmit, the determined user vehicle preference data to the server system, wherein the server system is communicatively coupled to the user computing device;
receive, from the server system, varied vehicle recommendation data comprising a plurality of vehicles each having a different vehicle make and vehicle model combination, wherein the varied vehicle recommendation data is generated by generating a weighted feature data set having weights based on the determined user vehicle preference data, applying a similarity model, and applying a variability filter; and
display, on the user interface, a visual representation of the varied vehicle recommendation data.

12. The system of claim 11, wherein the instructions to determine user vehicle preference data comprises instructions to provide at least one of vehicle and vehicle features to a user and receiving user selections of preferred vehicle or vehicle features via the user interface.

13. The system of claim 11, wherein the instructions to determine user vehicle preference data based on user interaction with the provided plurality of vehicle selections comprises tracking user browsing history on the user computing device.

14. The system of claim 13, wherein the browsing history includes at least one of vehicles or vehicle features previously browsed by a user of the user interface.

15. The system of claim 11, wherein the instructions to determine user vehicle preference data comprises instructions to provide a user with a questionnaire regarding user vehicle preference data.

16. The system of claim 11, wherein the visual representation comprises at least one of profiles, charts, and digital flip books.

17. The system of claim 11, wherein the user computing device comprises instructions to:
determine user interaction with the displayed visual representation of the varied vehicle recommendation data;
generate updates to the weighted feature data set;
transmit the updated weighted feature data set to the server system;
receive, from the server system, an updated varied vehicle recommendation data; and
display a second visual representation of the updated varied vehicle recommendation data.

18. The system of claim 11, wherein the user interface is optimized for display on the user computing device by displaying a subset of the varied vehicle recommendation data in accordance with relevancy.

19. The system of claim 11, wherein the user interface comprises a panel configured to display the determined user vehicle preference data.

20. The system of claim 11, wherein the user interface comprises detailed vehicle information for any vehicles selected from the displayed visual representation.

* * * * *